United States Patent

Kobori et al.

[15] 3,693,433
[45] Sept. 26, 1972

[54] ULTRASONIC ANEMOMETER

[72] Inventors: Yasuhiro Kobori, Tanashi; Yukiji Morita, Tokyo, both of Japan

[73] Assignee: Kaijo Denki Kabushiki Kaisha (A. K/a Kaijo Denki Co. Ltd.), Tokyo-to, Japan

[22] Filed: March 31, 1970

[21] Appl. No.: 24,213

Related U.S. Application Data

[63] Continuation-in-part of Ser. No. 667,279, Sept. 12, 1967, abandoned.

[52] U.S. Cl. ....................................................73/189
[51] Int. Cl. ..............................................G01w 1/02
[58] Field of Search............73/194 A, 189, 188, 170

[56] References Cited

UNITED STATES PATENTS

| 3,440,876 | 4/1969 | Hayes et al. | 73/194 A |
| 3,435,677 | 4/1969 | Gardner | 73/189 |
| 3,336,801 | 8/1967 | Snavely | 73/194 A |
| 2,928,277 | 3/1960 | Cavanagh | 73/189 X |
| 3,548,653 | 12/1970 | Corey | 73/189 |
| 3,379,060 | 4/1968 | Pear, Jr. | 73/189 |

Primary Examiner—Richard C. Queisser
Assistant Examiner—Marvin Smollar
Attorney—Robert E. Burns and Emmanuel J. Lobato

[57] ABSTRACT

An ultrasonic anemometer for detecting the direction and the magnitude of the wind by the use of two pairs of ultrasonic transmitters and receivers arranged in the wind in spaced-apart opposition to each other and in reverse sense directions to each other and each pair of received ultrasonic pulsive signals is converted to a pulse the duration of which is proportional to a time difference between respective incoming instants of said each pair of received ultrasonic pulsive signals. The setting of a multivibrator is carried out when the instantaneous level of the signal exceeds a predetermined threshold level and the resetting of the multivibrator is carried out when the number of zero-crossing instants of the signal reaches a predetermined number so that the incoming instant is detected at the resetting of the multivibrator for each of the received ultrasonic pulsive signals. The velocity of wind along the sense direction can be detected by discriminating the duration of the pulse converted.

5 Claims, 15 Drawing Figures

ULTRASONIC ANEMOMETER

This application is a continuation-in-part of our copending application, Ser. No. 667,279, filed on Sept. 12, 1967, and now abandoned.

This invention relates to ultrasonic anemometers.

In the anemometer using ultrasonic pulsive waves, each of the received ultrasonic pulsive waves has a considerably short duration, such as 0.1 $\mu$ seconds and 100 $\mu$ seconds respectively corresponding to wind velocities 5 centimeters/second and 50 meters/second, in a period of the 2 milliseconds. However, since the durations of pulses are very short and powers of the pulses are very small, it is very difficult to produce a detected output signal having a sense and magnitude which are a function of the duration of the received pulse from a reference. Accordingly, if it is necessary to indicate the durations of received pulses after digital-to-analogue conversion, errors are usually accompanied with such indication in the conventional arts.

An object of this invention is to provide an ultrasonic anenometer for detecting the direction and the magnitude of the wind in a highly reliable manner.

To attain the above mentioned object and other object of this invention, an ultrasonic anemometer of this invention uses two pairs of ultrasonic transmitters and receivers arranged in the wind oppositely in reverse sense directions to each other. Moreover, each pair of received ultrasonic pulsive signals obtained from respective receivers in response to each of the sending pulses generated at a period in a simultaneous manner is converted to a pulse the duration of which is proportional to a time difference between respective received instants of said each pair of received ultrasonic pulsive signals. The velocity of wind along the sense direction can be detected by discriminating the duration of the pulse converted.

The novel features of this invention are set forth with particularity in the appended claims; however, this invention, as to its construction and operation together with other objects and advantages thereof, may best be understood by reference to the following description, taken in connection with the accompanying drawings, in which the same parts are designated by the same characters, numerals and symbols, and in which FIG. 1 is a block diagram illustrating an example of a pulse duration discriminator employed in the ultrasonic anemometer of this invention;

Figure 1:
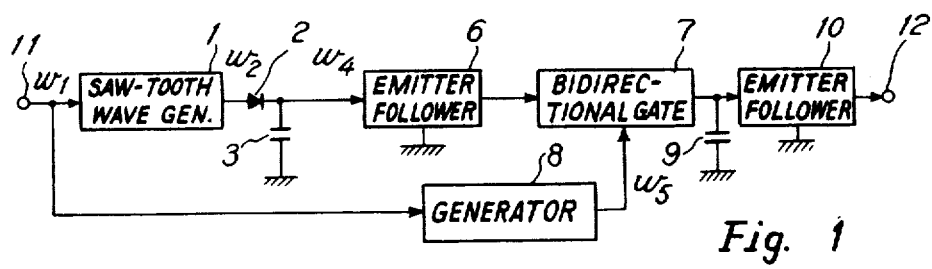

For ready understanding of the anemometer of this invention, an example of a pulse-duration discriminator employed in the receiving side of the ultrasonic anemometer of this invention will first be described with reference to FIGS. 1 and 2. This example comprises a saw-tooth wave generator 1, a first capacitor 3, a bidirectional gate 7, a generator 8 and a second capacitor 9. The saw-tooth wave generator 1 generates, in response to each of received pulses $w_1$ applied through an input terminal 11, an intermittent saw-tooth wave $w_2$ which has a constant slope and a duration which coincides substantially with the duration of the received pulse $w_1$. The first capacitor 3 is connected, through a diode 2, to the output of the saw-tooth wave generator 1 and is employed for temporarily charging the voltage of the saw-tooth wave $w_2$ after the termination of the saw-tooth wave $w_2$. The generator 8 generates gating pulses $w_5$ each of which is timed with the termination of the saw-tooth wave $w_2$. The bidirectional gate 7 is employed for transferring the charged voltage of the first capacitor 3 to the second capacitor 9 when any of the gating pulses $w_5$ is applied to the gate 7. If necessary, emitter followers 6 and 10 are respectively arranged at the input and output slides of the bidirectional gate 7.

An example of the operation of the device of FIG. 1 will be described in details with reference to FIG. 2. Pulses $P_1$, $P_2$, $P_3$, . . . of a pulse signal $w_1$ are the input pulses applied from the input terminal 11 at a period T. The saw-tooth wave generator 1 generates a saw-tooth wave $w_2$. In this case, the slope of the intermittent saw-tooth wave $w_2$ is constant and the duration of each of the intermittent saw-tooth waves $w_2$ coincides substantially with the duration of corresponding pulse ($P_1$, $P_2$, $P_3$, . . . ). Accordingly, the charged voltage of the first capacitor 3 changes as shown in a wave form $w_4$ and has a magnitude proportional to the peak voltage of the saw-tooth wave $w_2$. The diode 2 is employed for applying the saw-tooth wave $w_2$ to the capacitor 3 but avoiding discharge of the charged voltage through the saw-tooth wave generator 1. The gating pulses are generated in a generator 8, as are shown in a wave-form $w_5$, in response to the termination instants of the respective received pulses and applied to the bidirectional gate 7. Accordingly, the charged voltage of the first capacitor 3 is transferred through the emitter follower 6 and the bidirectional gate 7 to the second capacitor 9. A wave form $w_6$ shows the transferred charged voltage at the capacitor 9.

Figure 2:
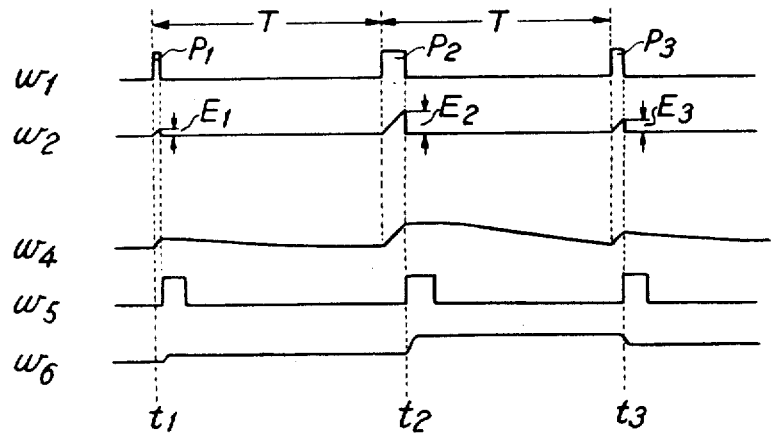
FIG. 2 shows wave-form diagrams explanatory of the operation of the example shown in FIG. 1.

In the example shown in FIG. 1, the emitter follower 6 acts as a variable dc voltage source having an output voltage proportional to the charged voltage of the capacitor 3. Accordingly, when the bidirectional gate 7 is opened in response to gating pulses of the wave $w_5$, the charged voltage of the capacitor 3 is correctly transferred to the capacitor 9 irrespective of the relationship between magnitudes of the charged voltages of the capacitors 3 and 9. However, if the capacitance of the capacitor 3 is much higher than that of the capacitor 9, the emitter follower 6 may be eliminated since the charged voltage of the capacitor 3 is not affected by the transferred voltage of the capacitor 9 in case of opening the bidirectional gate 7. Details of the transferring operation between capacitors 3 and 6 will be described hereafter.

Figure 3:
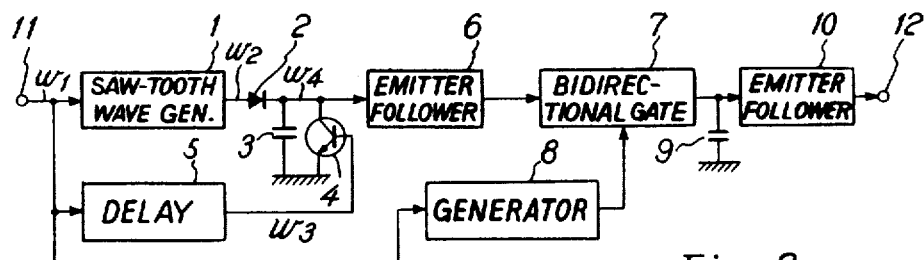
FIG. 3 is a block diagram illustrating another example of a pulse duration discriminator employed in the ultrasonic anemometer of this invention.

In the example of FIG. 1, the capacitance of the capacitor 3 is so selected that the discharging slope for each of applied pulses ($P_1$, $P_2$, $P_3$, ... ) reaches substantially the zero level as far as possible. However, if the capacitance of the capacitor 3 is too small, the charged voltage of the capacitor 3 is liable to be erroneously gated and transferred to the capacitor 9 unless each of the gating pulses of the wave $w_5$ has a very short duration and is correctly timed with the peak instant of each of the charged voltages. On the contrary, if the capacitance of the capacitor 3 is too large, the discharging slope of the charged voltage will not reach the zero level at the instant of the just succeeding pulse, so that the charged voltage has an erroneous peak value disproportionate to the duration of the received pulse. To avoid the above mentioned difficulty, the above mentioned pulse-duration discriminator can be provided with discharge means as is shown in FIG. 3. In this case, the discharge means is composed of a delay circuit 5 and a transistor 4 by way of example and employed for discharging the charged voltage of the first capacitor 3 after a predetermined duration. The path from the emitter to the collector of the transistor 4 is connected across the first capacitor 3, and the output of the delay circuit 5 is applied to the base of the transistor 4. The operation of this arrangement will be described with reference to FIG. 4, but particularly as to different parts from the arrangement shown in FIG. 1. Each of the received pulses $P_1$, $P_2$, $P_3$ ... are delayed, by a time D, in the delay circuit 5 as shown in a wave form $w_3$ and then applied to the base of the transistor 4 to make it conductive. Accordingly, the charged voltage is discharged, through the transistor 4, after a predetermined time D from the received pulse ($P_1$, $P_2$, $P_3$, ... ). As the result of the arrangement shown in FIG. 3, it is possible that the capacitor 3 has a capacitance larger than that of the capacitor 3 of FIG. 1 and that the gating pulse $w_5$ does not always need a very short duration. Moreover, the transferred voltage of the capacitor 9 has a value correctly proportional to the duration of the received pulses. These conditions are advantageous to realize the actual discriminator.

Figure 5:
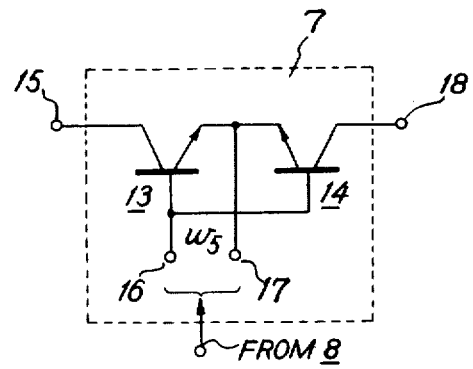
FIG. 5 is a connection diagram illustrating an example of the bidirectional gate employed in the example of FIG. 1.

FIG. 5 is an example of the bidirectional gate 7, in which emitters of two NPN transistors 13 and 14 are connected to each other to form a terminal 17 and bases of the transistors 13 and 14 are connected commonly to a terminal 16. Collectors of the transistors 13 and 14 are respectively connected to terminals 15 and 18 which are respectively employed as the above mentioned input and output of the bidirectional gate 7. The gating pulses $w_5$ are applied between the terminals 16 and 17 from the generator 8.

Figure 4:
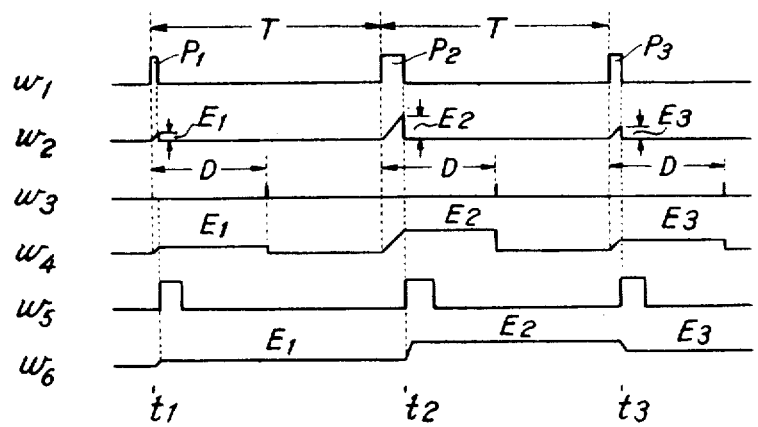
FIG. 4 shows wave-form diagrams explanatory of the operation of the example shown in FIG. 3.

Referring to FIGS. 4 and 5, the aforementioned transferring operation of the charged voltage from the first capacitor 3 to the second capacitor 9 will be described in details. In the case where a dc voltage $E_1$ of the wave-form $w_4$ is applied to the terminal 15, the potential of the terminal 15 is higher than that of the terminal 18. Accordingly, the transistor 14 is conductive and the transistor 13 is not conductive. However, when a gate pulse $w_5$ from the generator 8 is applied between terminals 16 and 17, the transistor 13 becomes conductive at an interval only where the gating pulse $w_5$ continues. At the same time, the path between terminals 15 and 18 becomes conductive. Accordingly, the charged voltage $E_1$ of the first capacitor 3 passes through the conductive path of the bidirectional gate 7 and is transferred to the second capacitor 9. The transferred voltage $E_1$ is held, as it is, after the termination of the gating pulse $w_5$ and derived from the emitter follower 10 to the output terminal 18.

When the next charged voltage $E_2$ having a voltage corresponding to the duration of the received pulse $P_2$, is obtained in the first capacitor 3, the charged voltage $E_2$ of the first capacitor 3 is similarly transferred to the second capacitor 9 since the charged voltage $E_2$ of the first capacitor 3 is higher than the charged voltage $E_1$ of the second capacitor 9. Accordingly, the terminal voltage of the second capacitor 9 changes along the wave-form $w_6$ within a time $t_2$ to $t_3$.

At a time $t_3$, the next charged voltage $E_3$ having a voltage corresponding to the duration of the received pulse $P_3$ is obtained at the capacitor 3. However, the charged voltage $E_3$ of the first capacitor 3 is lower than the charged voltage $E_2$ of the second capacitor 9. Accordingly, if the gate pulse $w_5$ is applied between terminals 16 and 17 so that the path between terminals 15 and 18 becomes conductive, the charged voltage $E_2$ of the second capacitor 9 is discharged, through the conductive path of the bidirectional gate 7 and the emitter follower 6 until the charged voltage $E_3$ of the first capacitor 3 is transferred to the capacitor 9. As the result of the above operation, the terminal voltage of the second capacitor 9 changes along the wave-form $w_6$. In this case, since the output voltage of the emitter follower 6 is proportional to the charged voltage of the capacitor 3, the transferred voltage of the capacitor 9 is generally proportional to the charged voltage of the capacitor 3. The emitter follower 6 may be, of course, replaced by a cathode follower.

With reference to FIGS. 6, 7A, 7B and 8, an example of the ultrasonic anemometer of this invention will now be described.

Figure 7A:
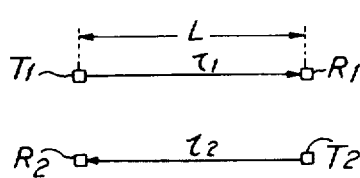
FIG. 7A and 7B are diagrams explanatory of the principle of the ultrasonic anemometer of this invention.

The general principle of the anemometer will first be described with reference to FIGS. 7A and 7B. In the anemometer of the type, two pairs of ultrasonic transmitters $T_1$ and $T_2$ (electro-ultrasonic transducers) and receivers $R_1$ and $R_2$ (ultrasonic-electric transducer) are arranged as shown in FIG. 7A at a space L. Accordingly, the times $\tau_1$ and $\tau_2$ necessary to propagate the ultrasonic waves across the space L from the transmitter ($T_1$ or $T_2$) to the receiver ($R_1$ or $R_2$) are indicated as follows:

$$\tau_1 = \frac{L}{(c^2 - V_r^2)^{1/2} + V_d} \tag{1}$$

$$\tau_2 = \frac{L}{(c^2 - V_r^2)^{1/2} - V_d} \tag{2}$$

where

C is a velocity of the ultrasonic wave in the air;

$V_r$ is a perpendicular component of the wind velocity which is perpendicular to the direction from the transmitter to the receiver; and $V_d$ is a parallel component of the wind velocity which is parallel with the direction from the transmitter to the receiver.

Accordingly, a difference $\Delta\tau$ between the time $\tau_1$ and $\tau_2$ can be obtained as follows from the equations (1) and (2) if $C^2 > V^2$ $$\Delta\tau = \frac{2LVd}{c^2 - v^2} \approx \frac{2LV \cos\theta}{c^2} \quad (3)$$

where

V is a wind velocity in the direction of the wind;

$\theta$ is an angle between the velocities V and $V_d$.

If the space L is equal to a distance of 30 meters, the difference $\Delta\tau$ will be approximately equal to a valve 5.1 V cos $\theta$ ($\mu$ seconds). Accordingly, the component $V_d$ can be measured by detecting the difference $\Delta\tau$.

Figure 7B:
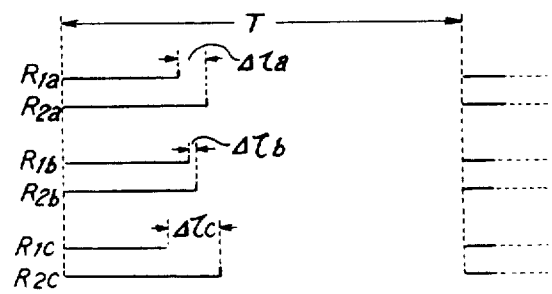

FIG. 7B shows examples ($\Delta\tau_a$, $\Delta\tau_b$, $\Delta\tau_c$,) of the difference $\Delta\tau$ in case of receiving them by the receivers $R_1$ and $R_2$ at three times shown by suffixes a, b and c. In the ultrasonic anemometer, the ultrasonic waves are simultaneously transmitted from both the transmitter $T_1$ and $T_2$ and in a period T.

Figure 6:
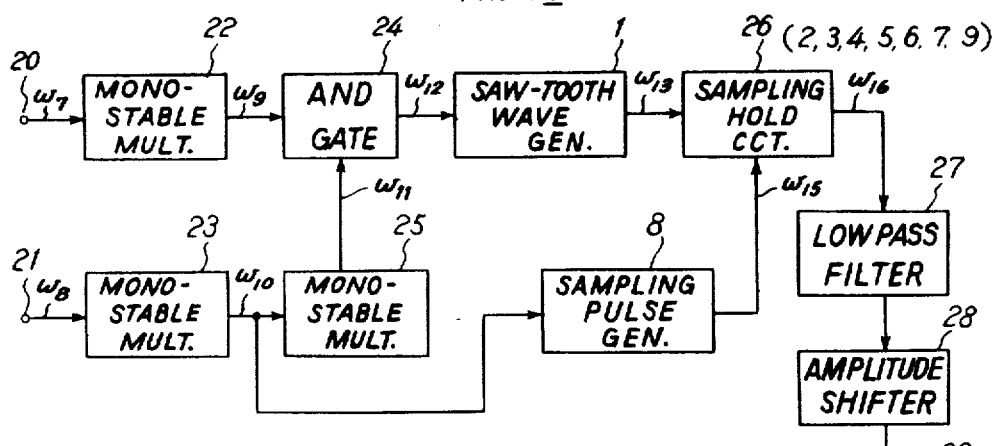
FIG. 6 is a block diagram explanatory of an example of the receiving side of the ultrasonic anemometer of this invention.

Incoming instants of the ultrasonic waves at the receivers $R_1$ and $R_2$ are respectively detected as pulse signals and applied to terminals 20 and 21 of the device shown in FIG. 6. If the incoming instants are detected by a signal receiving means described below, the detection operation for the incoming instants can be correctly performed without disturbance by noise.

Figure 8:
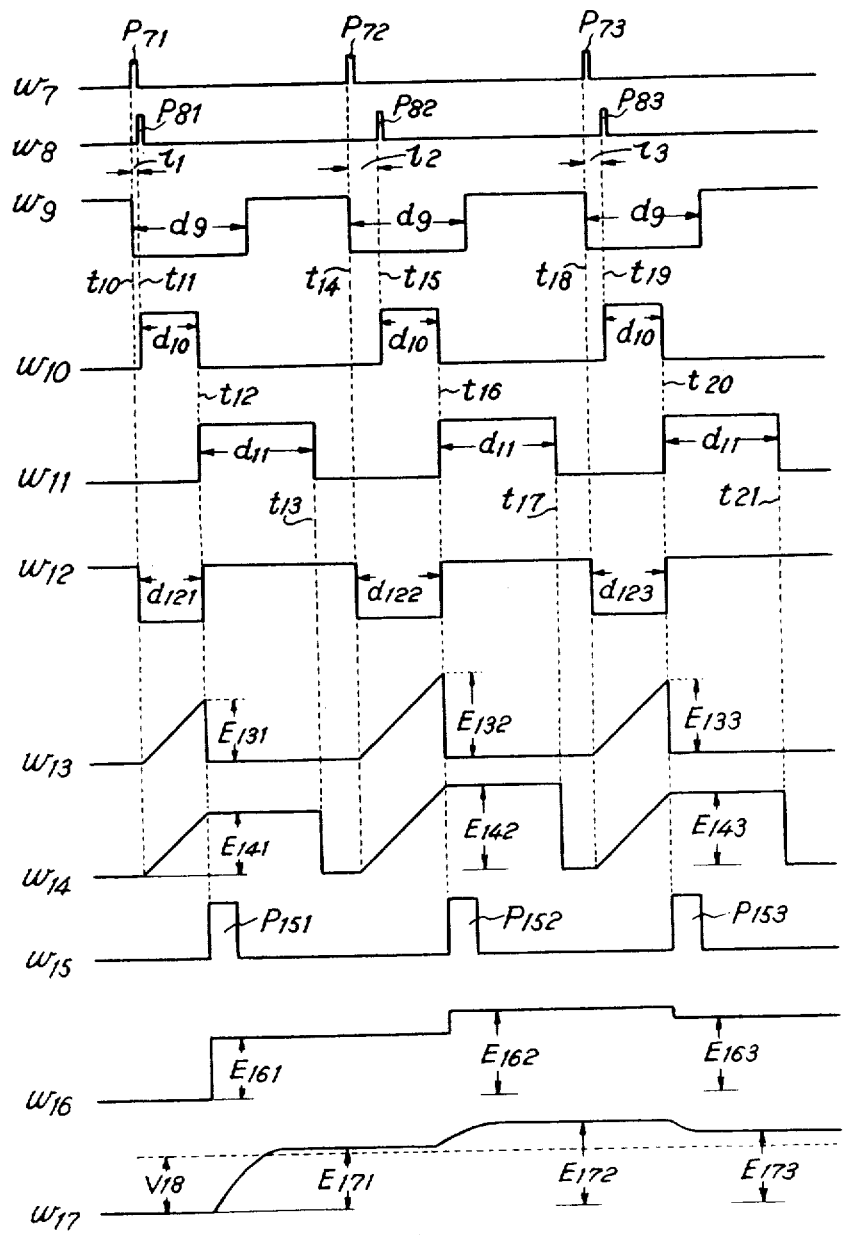
FIG. 8 shows wave-form diagram explanatory of the operation of the device shown in FIG. 6.

In response to each of pulses $P_{71}$, $P_{72}$, $P_{73}$ . . . of the wave $w_7$ generated in synchronism with transmitted ultrasonic waves as shown in FIG. 8, the monostable multivibrator 22 is set and reset after a time $d_9$, so that the multivibrator 22 generates minus pulses each having the duration $d_9$ as shown in a wave $w_9$. On the contrary, the monostable multivibrator 23 is set in response to each of pulses $P_{81}$, $P_{82}$, $P_{83}$ . . . of the wave $w_8$ and reset after a time $d_{10}$, so that the multivibrator 23 generates plus pulses each having the duration $d_{10}$ as shown in a wave $w_{10}$. In response to termination instants of the pulses of the wave $w_{10}$, the monostable multivibrator 25 generates plus pulses each having a duration $d_{11}$ as shown in a wave $w_{11}$. Accordingly, a wave $w_{12}$ corresponding to the waves $w_1$ described with reference to FIG. 2 is obtained at the output side of an AND gate 24. The pulses of the wave $w_{12}$ are generated in accordance with coincidence periods of minus polarities of the waves $w_9$ and $w_{11}$ and have durations $d_{121}$, $d_{122}$, $d_{123}$, . . . each of which is proportional to the difference between applied instants of a pair of pulses ($P_{71}$ and $P_{81}$), ($P_{72}$ and $P_{82}$), ($P_{73}$ and $P_{83}$) . . . . The detection of the respective durations $d_{121}$, $d_{122}$, $d_{123}$ can be performed similarly as described above. The saw-tooth wave generator 1 generates an intermittent saw-tooth wave $w_{13}$ which has a peak value ($E_{131}$, $E_{132}$, $E_{133}$, . . . ) proportional to the duration $d_{121}$, $d_{122}$, $d_{123}$, . . . ). A sampling hold circuit 26 is composed of the elements 2, 3, 4, 5, 6, 7 and 9 shown in FIG. 1 or 3 and produces a wave $w_{16}$ at its output side. The sampling pulse generator 8 generates sampling pulses $P_{151}$, $P_{152}$, $P_{153}$, . . . of a wave $w_{15}$ and applies them to the circuit 26 to transfer the charged voltages $E_{141}$, $E_{142}$, $E_{143}$ of the first capacitor 3 to the second capacitor 9 as shown in waves $w_{14}$ and $w_{16}$.

The output signal $w_{16}$ of the circuit 26 is applied to a low-pass filter 27 to produce a wave $w_{17}$ having gentle slopes. At an amplitude shifter 28, the level of the wave $w_{17}$ is shifted by a voltage $V_{18}$ to compensate the duration $d_{10}$ of the pulse of the wave $w_{10}$. The correctly detected output signal is obtained at an output terminal 29.

Figure 9:
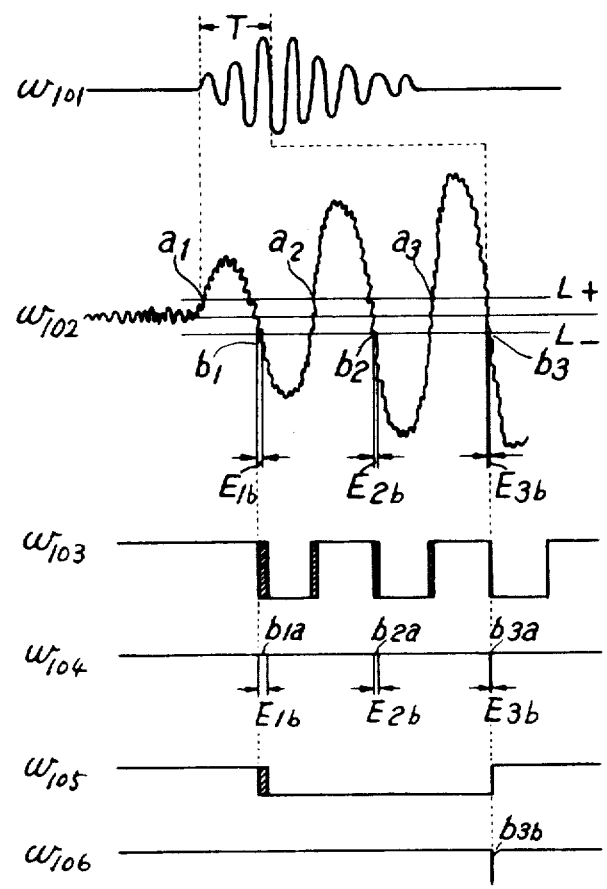
FIG. 9 shows wave-form diagrams explanatory of the principle and operation of signal receiving means used in the ultrasonic anemometer of this invention.

Referring to FIG. 9, the principle of the signal receiving means used in the ultrasonic anemometer of this invention will be described in comparison with the conventional system. A wave $w_{101}$ is an example of an ac receiving signal accompanying with transient distortion which is caused by high Quality Factors (Q) of an electro-acoustical transducer (e.g.; $R_1$ or $R_2$) and/or receiving circuitry as are well-known in the art. In other words, the peak values of cycles of the ac receiving signal gradually increase and then gradually decrease while they have a maximum value about a third cycle from the start thereof. In actual cases, noises are included in the received signal as illustrated by a wave $w_{102}$ of FIG. 9. Detection of zero-crossing instants of the wave $w_{102}$ is carried out by use of a predetermined threshold level $L+$ or $L-$. In this case, detected zero-crossing instants of the wave $w_{102}$ have deviations $E_{1b}$, $E_{2b}$, $E_3$ . . . , which are fluctuated in accordance with rising slopes of the wave $w_{102}$ and have a minimum value at the largest peak value of the wave $w_{102}$.

In conventional receiving systems, since a first cycle of the wave $w_{102}$ is detected by use of the threshold level $L+$ or $L-$, an instant $a_1$ or $b_1$ is detected as the incoming instant of the received wave $w_{102}$. However, the instant $a_1$ or $b_1$ has a relatively large deviation ($E_{1b}$ or $E_{2b}$) as mentioned above because of the included noise. Accordingly, the preciseness of detecting the incoming instant for a predetermined cycle of the received wave $w_{102}$ is not so high.

To raise the above mentioned preciseness, the receiving means used in the ultrasonic anemometer of this invention is provided with a multivibrator the setting of which is carried out in response to a first zero-crossing (e.g. the instant $a_1$). The resetting of the multivibrator is carried out as shown in a wave $w_{105}$ when a predetermined number of zero-crossings (e.g.; $b_{1a}$, $b_{2a}$ and $b_{3a}$ of a wave $w_{104}$) inclusive of the first zero-crossing are detected. The resetting instant of the multivibrator is determined as the incoming instant of the received wave $w_{102}$ (more particularly, as the incoming instant of the predetermined cycle of the received wave $w_{102}$). A pulse $b_{3b}$ of a wave $w_{106}$ is derived from the multivibrator as the incoming instant. At the instant $b_3$, the deviation value ($E_{3b}$) (i.e.; jitter) is very small as understood from the above description. Accordingly, the detection operation in the signal receiving means can be carried out with high preciseness.

Figure 10:
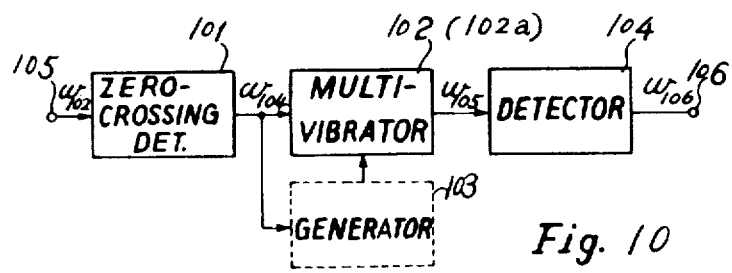
FIG. 10 is a block diagram illustrating an example of signal receiving means used in the ultrasonic anemometer of this invention.

Referring to FIG. 10, an example of the signal receiving means for realizing the above mentioned principle will be described. This example comprises a zero-crossing detector 101, a monostable multivibrator 102, and a detector 104. The zero-crossing detector 101 detects the zero-crossing instants of cycles of the received wave $w_{102}$ and produces zero-crossing pulses $b_{1a}$, $b_{2a}$, $b_{3a}$, . . . in response to the respective zero-crossing instants.

These pulses are applied to the monostable multivibrator 102 to set its state. The resetting of the monostable multivibrator 102 is carried out when the number of zero-crossing pulses reaches a predetermined number which is determined so as to coincide with the order number of a maximum-level cycle of the received wave $w_{102}$. In other words, the monostable multivibrator 102 is so designed that its resetting instant is synchronized with one of the zero-crossing pulses $b_{1a}$, $b_{2a}$, $b_{3a}$. . . which coincides with the order number of a maximum-level cycle of the received wave $w_{102}$, since the period of cycles of the received signal is usually known at the received side. The resetting instant is detected by the detector 104 which is composed of a differentiator and a rectifier connected in series by way of example.

The monostable circuit 102 may be replaced by a bistable multivibrator 102a. In this case, however, a generator 103 is to be inserted in the resetting circuit of the multivibrator 102a to count the number of said zero-crossing pulses $b_{1a}$, $b_{2a}$, $b_{3a}$ . . . and to generate a reset pulse when the number of zero-crossing pulses reaches the predetermined number.

In the above-mentioned system, if the zero level of the received wave $w_{102}$ is further fluctuated by larger noise, the zero-crossing instants cannot be correctly detected regardless of the disturbance of noise. Accordingly, it is generally difficult to detect stably the incoming instant of the received wave. To make the detection operation of the incoming instant in existence of noise more reliably, the signal receiving means can be further provided with an arrangement illustrated in FIG. 12. This arrangement comprises a clipper 108 and a filter 109.

Figure 11:
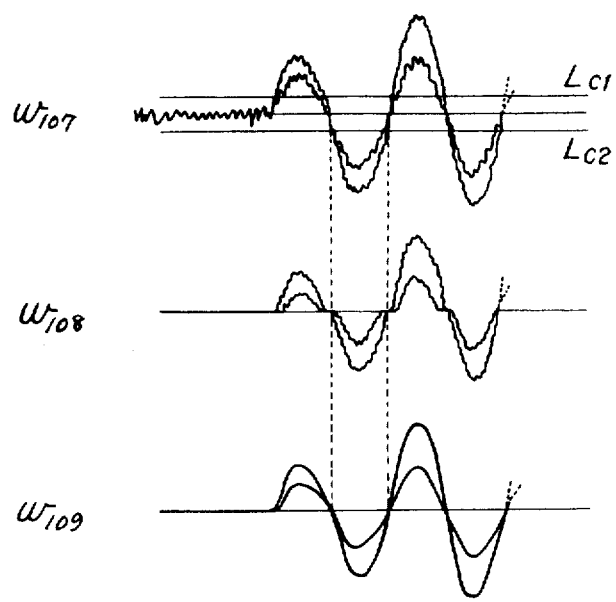
FIG. 11 shows wave-form diagrams explanatory of another feature of the signal receiving means.
Figure 12:
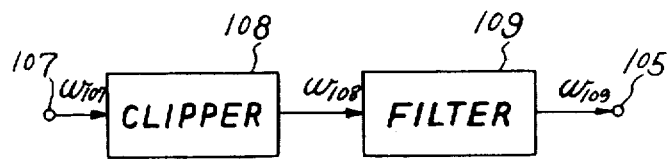
FIG. 12 is a block diagram illustrating an arrangement to be used in the signal receiving means.

The operation of this arrangement will be described with reference to FIGS. 11 and 12. A received wave $w_{107}$ is applied from an input terminal 107 to the clipper 108, in which the received wave $w_{107}$ is clipped by the use of clipping levels $L_{c1}$ and $L_{c2}$ exceeding the peak level of noise so as to produce a clipped wave $w_{108}$. This clipped wave $w_{108}$ is applied to the filter 109. This filter 109 has a pass-band, through which the received wave $w_{107}$ can be passed but components higher than the frequency of the received wave $w_{107}$ cannot be passed. Accordingly, the higher components included in the wave $w_{108}$ are checked at the filter 109, and an output signal $w_{109}$ having a sinusoidal wave form and having no disturbance of noise can be derived from the filter 109. As understood from the illustration, zero-crossing instants of the output wave $w_{109}$ have no "jitter" even if the amplitudes of respective cycles of the wave $w_{109}$ are fluctuated. The output signal $w_{109}$ is applied to the device shown in FIG. 10 through a terminal 105.

Figure 13:
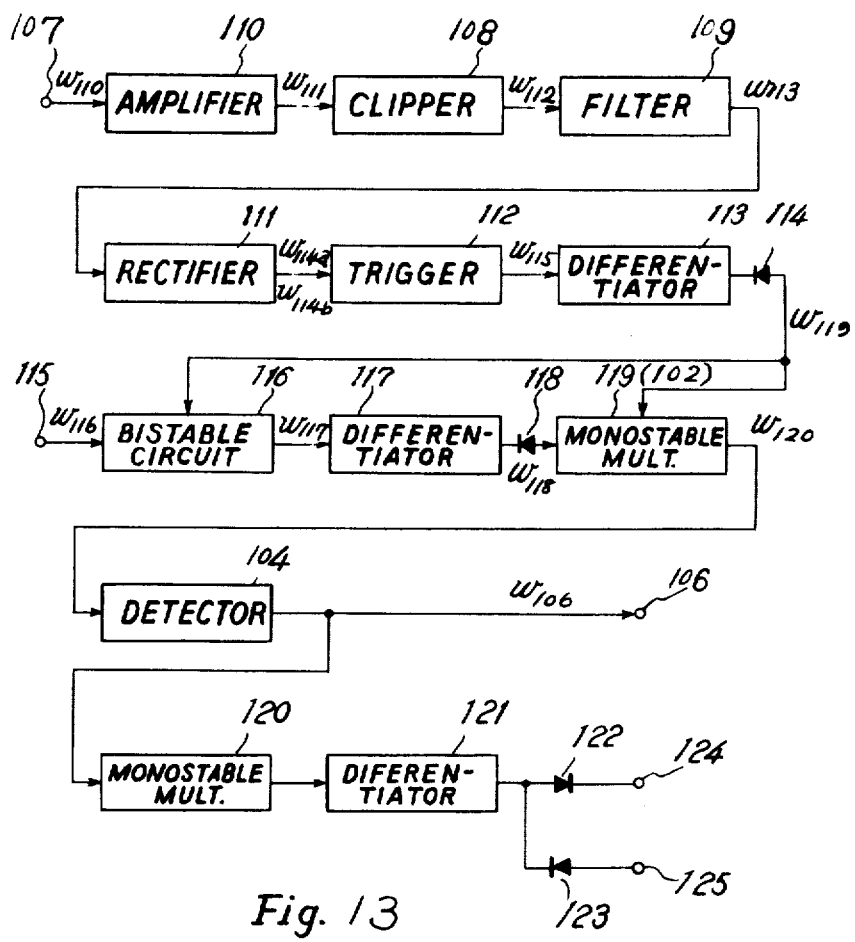
FIG. 13 is a block digram illustrating an actual example of signal receiving means.
Figure 14:
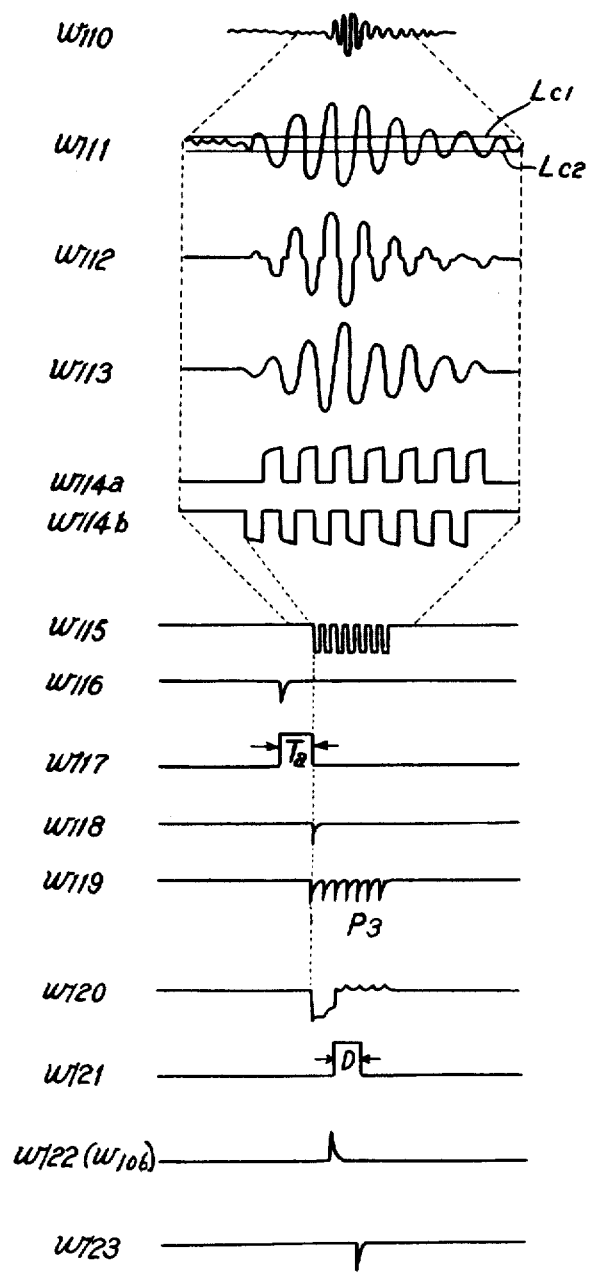
FIG. 14 shows wave-form diagrams explanatory of the operation of the example shown in FIG. 13.

Next, an actual example of the receiving means to detect a received signal in the ultrasonic anemometer of this invention will be described with reference to FIGS. 13 and 14. In the ultrasonic anemometer of this invention, two receiving means are provided so as to be respectively coupled to the receiving transducers $R_1$ and $R_2$ mentioned with reference to FIG. 7A. However, since the two receiving means are the same, only one receiving means is described below. In FIG. 13, the received wave $w_{110}$ is applied to an amplifier 110 through a terminal 107. The received wave $w_{110}$ is usually obtained by the use of a receiver inclusive of an ultrasonic-electric transducer (not shown). An amplified signal $w_{111}$ is applied to a clipper 108, in which the signal $w_{111}$ is clipped by the use of clipping levels $L_{c1}$ and $L_{c2}$ to produce a clipped signal $w_{112}$. The clipped signal $w_{112}$ is applied to a band-pass filter 109, from which a signal $w_{113}$ having a sinusoidal wave-form is obtained. The wave $w_{113}$ is amplified, if necessary, and rectified by a rectifier 111 so as to produce a wave $w_{114a}$ or $w_{114b}$. The rectified wave $w_{114a}$ or $w_{114b}$ is reshaped by a Schmitt trigger 112 as is shown by a wave $w_{115}$. The reshaped wave $w_{115}$ is converted to a pulse signal $w_{119}$ by the use of a differentiator 113 and a rectifier 114. The above circuits 110, 108, 109, 111, 112, 113, and 114 corresponds to the zero-crossing detector 101 as shown in FIG. 10.

On the other hand, a control pulse $w_{116}$ is applied, through a terminal 115, to a bistable circuit 116 to set its state. This control pulse $w_{116}$ described above with reference is generated in response to a sending pulse. The bistable circuit 116 is reset by the first pulse of the pulse signal $w_{119}$. Accordingly, the bistable circuit 116 produces an output pulse $w_{117}$. The termination instant of the output pulse $w_{117}$ is derived from a combination circuit of a differentiator 117 and a rectifier 118 as is shown by a pulse signal $w_{118}$. This pulse signal $w_{118}$ is applied to a monostable multivibrator 119 corresponding to the multivibrator 102, to set its state. Accordingly, noise disturbance occurring at times other than the duration $Ta$ of the pulse signal $w_{117}$ can be prevented at the input of the monostable circuit 119.

The monostable multivibrator 119 is so designed that the resetting of this multivibrator 119 is synchronized with a pulse of the pulse signal $w_{119}$ which corresponds to a predetermined order number (e.g.; third). A signal $w_{120}$ is an example of the output signal of the monostable multivibrator 119 where the resetting of the multivibrator 119 is synchronized with the third pulse $P_3$ of the pulse signal $w_{119}$. The termination instant of the signal $w_{120}$ is derived from the detector 104 as illustrated by the wave $w_{106}$ and mentioned with reference to FIGS. 9 and 10. The pulse signal $w_{106}$ is applied to a monostable multivibrator 120 to set its state. A pulse $w_{121}$ is obtained from the multivibrator 120, in which the duration D of the pulse $w_{121}$ is adjustable. The initial instant and the termination instant of the pulse $w_{121}$ are derived as pulses $w_{122}$ and $w_{123}$ respectively from terminals 124 and 125 by the use of a differentiator 121 and rectifiers 122 and 123. The duration D between pulses $w_{122}$ and $w_{123}$ can be employed for compensating the error as to spaces caused by any change of condition such as air temperature, between sending transducers and receiving transducers in the ultrasonic anemometer. The wave $w_{123}$ is applied to the monostable multivibrator 23 through the terminals 125 and 21 as the wave $w_8$. As mentioned above, the wave $w_8$ is obtained for each of the two receiving means which are respectively coupled to the two receiving transducers $R_1$ and $R_2$. Accordingly, the anemometer of this invention is possible to measure the instantaneous velocity of the wind in accordance with the principle described with reference to FIGS. 7A and 7B.

What we claim is:
1. An ultrasonic anemometer, comprising:

a first electro-ultrasonic transducer and a first ultrasonic-electric transducer arranged oppositely to each other at a predetermined sense direction;

a second electro-ultrasonic transducer and a second ultrasonic-electric transducer arranged oppositely to each other at said predetermined space in the reverse direction to said sense direction of said first pair;

means for simultaneously generating a train of successive ultrasonic pulses having a predetermined period from said first and second electro-ultrasonic transducers;

a first signal receiving means connected to the output of said first ultrasonic-electric transducer to receive incoming ac signals corresponding to the ultrasonic pulses and comprising a zero-crossing detector for detecting zero-crossing instants of the ac received signals and for producing zero-crossing pulses in response to the zero-crossing instants, a multivibrator set by the first pulse of the zero-crossing pulses for each of the received ac signals and reset in synchronism with one of the zero-crossing pulses which coincides with a predetermined order number of cycles of each of the received ac signals, and a detector for detecting the resetting instant of the multivibrator as the incoming instant of each of the received ac signals;

a second signal receiving means connected to the output of said second ultrasonic-electric transducer to receive incoming ac signals corresponding to the ultrasonic pulses and comprising a zero-crossing detector, multivibrator and detector alike those in said first signal receiving means;, a signal converter connected to said first signal receiving means and said second signal receiving means to obtain a pulse train the duration of each pulse of which is proportional to the time difference between said incoming instants respectively detected by said detector of said first signal receiving means and said second signal receiving means; and a pulse duration discriminator connected to said signal converter and comprising a saw-tooth wave generator for producing in response to each pulse of the pulse train a saw-tooth wave which has a substantially constant slope and the duration of which coincides substantially with the duration of said pulse of the pulse train, a first capacitor for temporarily charging to the voltage of the saw-tooth wave after the termination of the saw-tooth wave, a bidirectional gate having two input terminals to one of which the charged voltage is applied, a generator for generating gating pulses each of which is timed with the termination of the saw-tooth wave and applied to the bidirectional gate, and a second capacitor connected to the other input terminal of said bidirectional gate to receive the charged voltage of said first capacitor so as to produce a discriminated output signal indicative of the velocity of the wind along said sense direction.

2. An ultrasonic anemometer according to claim 1, in which each of said first and second signal receiving means includes a clipper for clipping the received ac signal by the use of a pair of clipping levels exceeding the peak level of incoming noise, and a filter for passing therethrough to its respective zero-crossing detector the received ac signal and for checking components higher than the frequency of the received signal.

3. An ultrasonic anemometer according to claim 1, in which each said first and second signal receiving means includes means for stopping application of the zero-crossing pulses to its respective multivibrator during a time interval which immediately precedes the received ac signal.

4. An ultrasonic anemometer according to claim 1, further including discharge means comprising a transistor having an emitter, collector and base and a delay circuit having a delay time equal to the predetermined duration, and wherein the path from the emitter and collector of said transistor is connected across said first capacitor and the output of said delay circuit is applied to the base of said transistor.

5. An ultrasonic anemometer according to claim 1, in which said bidirectional gate is composed of two NPN transistors each having an emitter, collector and base, and wherein the emitter and bases of said two transistors are respectively connected commonly to each other to form a pair of terminals for receiving the gating pulses and the collectors of said two transistors comprise inputs of bidirectional gate.

* * * * *